United States Patent
Kumar et al.

(10) Patent No.: US 6,343,287 B1
(45) Date of Patent: Jan. 29, 2002

(54) EXTERNAL DATA STORE LINK FOR A PROFILE SERVICE

(75) Inventors: Ravi Kumar, Louisville; Paul William Weschler, Jr., Broomfield, both of CO (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/314,375

(22) Filed: May 19, 1999

(51) Int. Cl.$^7$ .............................................. G06F 17/30
(52) U.S. Cl. .................. 707/4; 707/2; 707/3; 707/100; 707/200; 707/103 R; 707/103; 709/316
(58) Field of Search ........................... 707/2, 3, 4, 100, 707/200, 103 R, 103; 709/316

(56) References Cited

U.S. PATENT DOCUMENTS

| | | | | |
|---|---|---|---|---|
| 5,692,175 A | * | 11/1997 | Davies et al. .................. | 707/3 |
| 5,734,887 A | * | 3/1998 | Kingberg et al. .............. | 707/4 |
| 5,787,412 A | * | 7/1998 | Bosch et al. ................... | 707/2 |
| 5,832,506 A | | 11/1998 | Kuzman ..................... | 707/200 |
| 5,838,970 A | * | 11/1998 | Thomas ....................... | 709/316 |

OTHER PUBLICATIONS

RFC 2251 Lightweight Directory Access Protocol (v3), by M. Wahl et al., Dec. 1997 (Internet Engineering Task Force).

RFC 2589 "Lightweight Directory Access Protocol (v3) Extensions for Dynamic Directory Services" By Y. Yaacovi et al., May 1999 (Internet Engineering Task Force).

* cited by examiner

*Primary Examiner*—Paul R. Lintz
(74) *Attorney, Agent, or Firm*—Stuart T. Langley; William J. Kubida; Hogan & Hartson LLP

(57) ABSTRACT

A profile service, instance is linked to a plurality of external data stores. Each external data store is associated with a predefined data store connector class that describes a connector object that establishes a link and provides methods to query the associated data store. An external data store profile is created in the profile service that names the connector class. An external data store reference object is created in the profile service instance that identifies the external data store profile and a number of parameters that specify particular data desired from the external data store. A profile within the profile service instance includes an attribute that names the data store reference object. When the attribute is evaluated, the data store reference object is instantiated, optionally using parameters specified at runtime, and passed as a parameter to an instance of the data store connector class identified by the external data store profile. The external data store connector instance applies the query methods to retrieve the desired data and return the desired data to the data store reference object. The profile service instance uses the returned data as the value of the attribute.

30 Claims, 6 Drawing Sheets

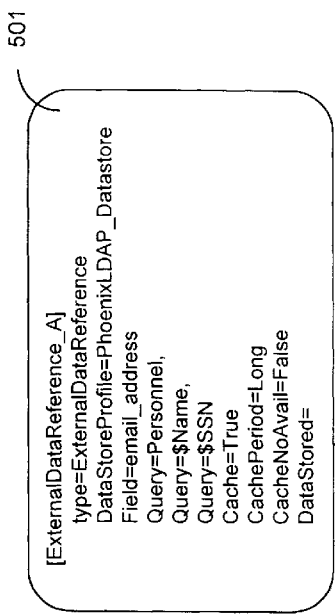

[ExternalDataReference_A]
type=ExternalDataReference
DataStoreProfile=PhoenixLDAP_Datastore
Field=email_address
Query=Personnel,
Query=$Name,
Query=$SSN
Cache=True
CachePeriod=Long
CacheNoAvail=False
DataStored=

501

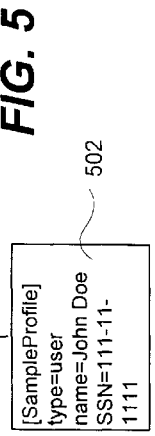

[SampleProfile]
type=user
name=John Doe
SSN=111-11-1111

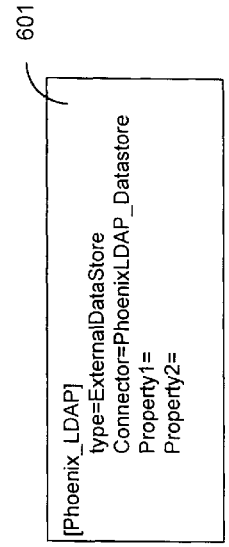

[Phoenix_LDAP]
type=ExternalDataStore
Connector=PhoenixLDAP_Datastore
Property1=
Property2=

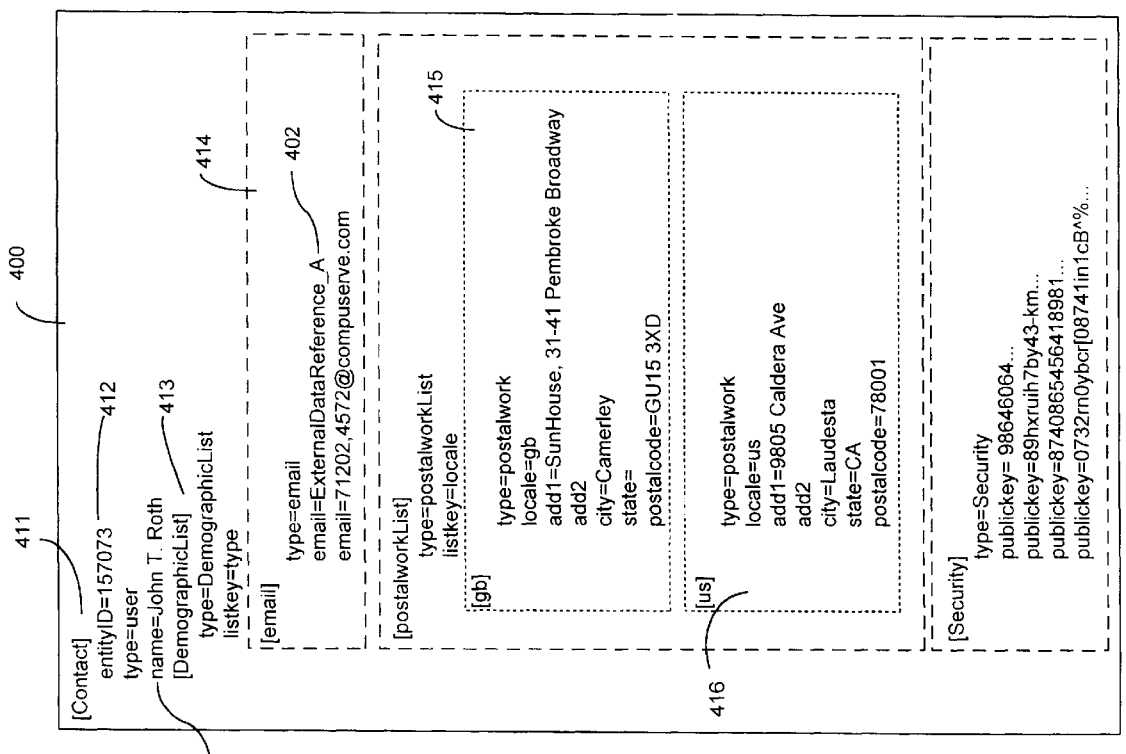

400

[Contact]
entityID=157073 — 412
type=user
name=John T. Roth — 413
[DemographicList]
type=DemographicList
listkey=type

[email]
type=email
email=ExternalDataReference_A
email=71202.4572@compuserve.com

[postalworkList]
type=postalworkList
listkey=locale

[gb]
type=postalwork
locale=gb
add1=SunHouse, 31-41 Pembroke Broadway
add2
city=Camerley
state=
postalcode=GU15 3XD

[us]
type=postalwork
locale=us
add1=9805 Caldera Ave
add2
city=Laudesta
state=CA
postalcode=78001

[Security]
type=Security
publickey= 98646064...
publickey=89hxruih7by43-km...
publickey=87408654564i8981...
publickey=0732rn0ybcf[08741in1cB^%...

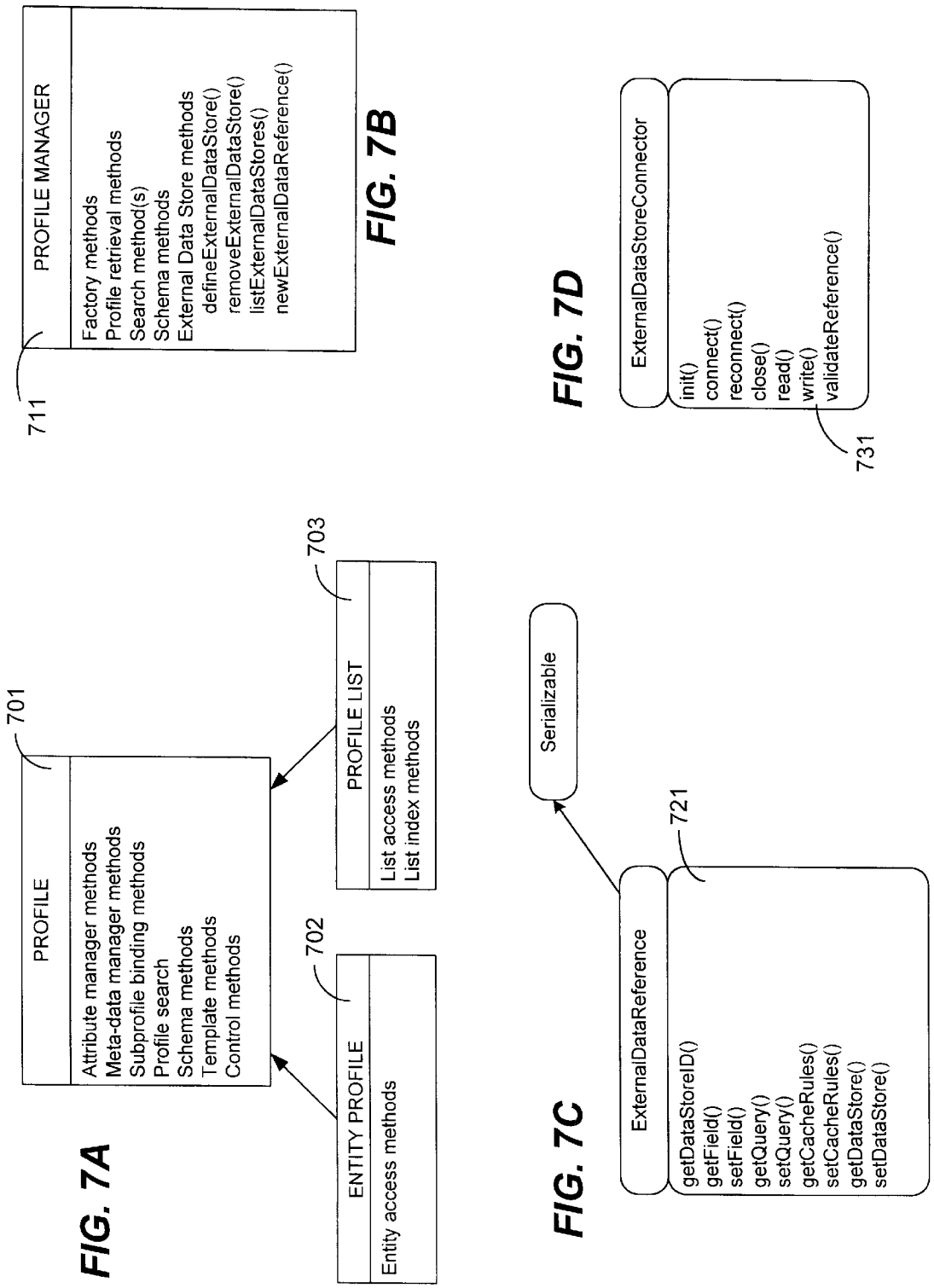

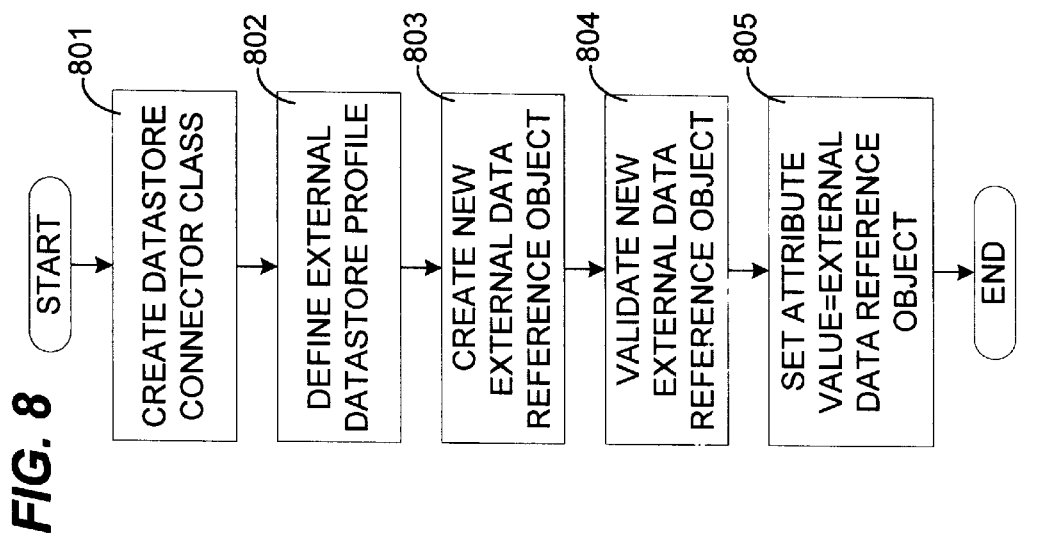

EXTERNAL DATA STORE LINK FOR A PROFILE SERVICE

BACKGROUND OF THE INVENTION

1. Field of the Invention.

The present invention relates, in general, to enterprise computing systems and methods, and, more particularly, to a method and system that provides a high performance interface to integrate, store, retrieve and manage reference information about entities.

2. Relevant Background.

Computer systems including business systems, entertainment systems, and personal communication systems are increasingly implemented as distributed software systems. These systems are alternatively referred to as "enterprise networks" and "enterprise computing systems". These systems include application code and data that are distributed among a variety of data structures, data processor systems, storage devices and physical locations. They are intended to serve a geographically diverse and mobile set of users. This environment is complicated because system users move about the distributed system, using different software applications to access and process data, different hardware to perform their work, and often different physical locations to work from. These trends create a difficult problem in providing a secure yet consistent environment for the users.

In general, distributed computing systems must scale well. This means that the system architecture desirably adapts to more users, more applications, more data, and more geographical distribution of the users, applications, and data. The cost in money and time to switch over a network architecture that is adapted to a smaller business to one suited for a larger business is often prohibitive.

A conventional computing system uses a client/server model implemented on a local area network (LAN). In such systems powerful server computers (e.g., application servers and file servers) are used to process and access data. The requested data is then transmitted to the client computer for further processing. To scale to larger networks, multiple LANs may be internetworked using, for example, leased data lines to create a wide area network (WAN). The equipment required to implement a WAN is expensive and difficult to administer. Also, as networks become larger to include multiple LANs and multiple servers on each LAN it becomes increasingly difficult to find resources (i.e., files, applications, and users) on any one of the LANs.

As computing power continues to become less expensive, clients tend to process and store their own data, using the server primarily as a file server for sharing data with other client computers. Each software application running on the client, or the client's operating system (OS) may save client-specific configuration data that is used by the client to finetune and define the user's software environment at runtime.

As used herein, the term "profile information" refers to any information or meta-data used by a particular piece of hardware, software, or operating system to configure, initialize, shutdown and aide in making runtime processing decisions. The profile information may be associated with a particular application or group of applications, a particular hardware device or group of devices, as well as a particular user or group of users. Some operating systems store user profile information that is used during boot operations at application startup to tailor a limited number of the system characteristics to a particular machine user. However, this profile information is closely tied to a single machine and operating system. As a result, the profile information is not useful to a new user the first time that user logs onto a particular machine. Moreover, this information is not available to remote users that are accessing the LAN/WAN using remote access mechanisms.

Existing mechanisms tend to focus on a single type of profile information, user information or application information or hardware information. Also, because these mechanisms are very application specific they limit the number and type of attributes that can be retained. Further, the profile information is isolated and fails to indicate any hierarchical or relational order to the attributes. For example, it may be desirable that a user group is required to store all files created using a particular application suite to a specific file server. Existing systems, if such a service is available at all, must duplicate profile information in each application program merely to implement the required file storage location preference. Storage location direction based on a user-by-user or user group basis is difficult to implement and may in fact require a shell application running on top of the application suite. Even then, the system is not extensible to access, retrieve, and use profile information for a new user that has not used a particular machine before.

As in the example above, existing systems for storing configuration information lead to duplicative information stored in many locations. Each application stores a copy of its own configuration information, as does each hardware device and each user. Much of this information is identical. It is difficult to maintain consistency among these many copies in a distributed computing environment. For example, when the specified file storage location changes, each copy of the configuration information must be changed. The user or system administrator must manually track the location and content of each configuration file.

An example of the inefficiencies of these types of systems is found in the Windows 95 registry file that holds profile information but has an acknowledged tendency to bloat over time with duplicative and unused data. Moreover, the registry file in such systems is so closely tied to a particular machine and instance of an operating system that it cannot be remotely accessed and used to configure other computers or devices. Hence, these systems are not generally extensible to manage multiple types of profile information using a single mechanism. A need exists for profile information that is readily accessible to all machines coupled to a network and to machines accessing the network through remote access mechanisms.

Another complicating influence is that networks are becoming increasingly heterogeneous on many fronts. Network users, software, hardware, and geographic boundaries are continuously changing and becoming more varied. For example, a single computer may have multiple users, each of which work more efficiently if the computer is configured to meet their needs. Conversely, a single user may access a network using multiple devices such as a workstation, a mobile computer, a handheld computer, or a data appliance such as a cellular phone or the like. A user may, for example, use a full featured email application to access email while working from a workstation but prefer a more compact application to access the same data when using a handheld computer or cellular phone. In each case, the network desirably adapts to the changed conditions with minimal user intervention.

There is increasing interest in remote access systems that enable a user to access a LAN/WAN using a public, generally insecure, communication channels such as the Internet. Further, there is interest in enabling LANs to be internetworked using public communication channels. This is desirable because the network administrator can provide a single high speed gateway to the Internet rather than a remote server/modem combination for each user and expensive WAN communication lines. The Internet gateway can use leased lines to access the Internet rather than more costly business phone lines. Also, the Internet gateway can be shared among a variety of applications and so the cost is not dedicated solely to providing remote access or wide area networking. The reduction in hardware cost and recurrent phone line charges would be significant if remote users could access the LAN/WAN in this manner.

From a network user's perspective these limitations boil down to a need to manually configure a given computer to provide the user's desired computing environment. From a remote user's perspective these limitations require the user to manually reconfigure the remote access computer to mimic the desired computing environment or tolerate the generic environment provided by default by the remote access server. From a network administrator's perspective, these complications require software and operating systems to be custom configured upon installation to provide the desired computing environment. In each case, the time and effort consumed simply to get "up and running" is a significant impediment to efficient use of the distributed computing environment. What is needed is a system that readily adapts to a changing, heterogeneous needs of a distributed network computing environment.

One solution to the problem of finding resources in a distributed system is to use directories. Directories are data structures that hold information such as mail address book information, printer locations, public key infrastructure (PKI) information, and the like. Because of the range of functions and different needs of driving applications, most organizations end up with many different, disparate directories. These directories do not interact with each other and so contain duplicative information and are difficult to consistently maintain.

Directory software tends to be special purpose to serve the needs of a defined set of users to access information about and stored in a defined set of data store mechanisms. For example, a DOS file system (i.e., a directory of filename-:physical location information) is written to be accessible only by a particular operating system (e.g., DOS, Windows, Unix, and the like). Hence, the file system information is not accessible to computers running other operating systems. Similarly, a file system cannot be amended to serve as a directory for other types of devices (e.g., an email directory). Moreover, the functionality of a file system is rigidly fixed and is not readily extended to provide new functionality such as authentication, replication, file system logging, and the like. These types of changes require rewrite and recompile of the file system software. A need exists for a directory system that is flexible and adaptable to service a variety of user entities, store directory information about a variety of objects, and incorporate a variety of functionality at runtime.

X.500 is one current model for managing on-line directories of users and resources (Directory Services) that includes the overall namespace as well as the protocol for querying and updating it. An X.500 directory is called a Directory Information Base ("DIB") and the program that maintains the DIBs is called a Directory Server Agent ("DSA"). A Directory Client Agent ("DCA") is used to search DSA sites for names and addresses.

The protocol generally used in conjunction with X.500 is the "DAP" (Directory Access Protocol) and it operates over the OSI (Open System Interconnection) network protocol stack. Due to the fact that a full DAP client is difficult to implement on smaller computer systems, the LDAP, (Lightweight Directory Access Protocol) was developed.

Like X.500, LDAP is both an information model and a protocol for querying and manipulating it and the overall data and namespace model is essentially that of X.500. A fundamental difference between DAP and LDAP is that the latter protocol is designed to run directly over the TCP/IP (Transmission Control Protocol/Internet Protocol) stack, and it lacks some of the DAP protocol functions such as security. In operation, LDAP enables a user to locate organizations, individuals, and other resources such as files and devices in a network, whether on the Internet or on a corporate intranet.

In a network, a directory is used to indicate where in the network something is located. On TCP/IP networks (including the Internet), the Domain Name System ("DNS") is the directory system used to relate the domain name to a specific network address or unique location on the network. If the domain name is not known, LDAP allows a user to initiate a search for, for example, an individual without knowing exactly where he is located. Simply stated, an LDAP directory is organized in a simple "tree" hierarchy and may consist, for example, of the following levels:

The "Root" directory (the starting place or the source of the tree), which branches out to Countries, each of which branches out to Organizations, which branch out to Organizational units (divisions, departments, and so forth), which branches out to (includes an entry for)

Individuals (which includes people, files, and shared resources such as printers)

An LDAP directory can be distributed among many servers, and each server can have a replicated version of the total directory that is synchronized periodically. When an LDAP server receives a request from a user, it takes responsibility for the request, passing it to other DSAs as necessary, but nevertheless ensuring a single coordinated response for the user.

The Internet Engineering Task Force (IETF) is a large open international community of network designers, operators, vendors, and researchers concerned with the evolution of the Internet architecture and the smooth operation of the Internet. IETF publishes specifications for various internet protocols including LDAP. The current LDAP protocol is specified in RFCs (Request For Comments) 1777 and 1778 while the string representation of LDAP search filters is specified in RFC 2254. The disclosures of RFC 1777, RFC 1778 and RFC 2254 are specifically incorporated herein by this reference.

Meta-directories are a partial solution that provide a directory integration to unify and centrally manage disparate directories within an enterprise. However, existing solutions are not sufficiently extensible to account for the wide variety and continuously changing set of resources for which directory information is desirable. In particular, links to external data store devices are difficult to configure and limited in variety. A meta-directory manufacturer provides a limited set of directory services (e.g., LDAP, X.500, and the like) and the user is limited to those provided services. As a result users cannot link to new data store services that become available.

Moreover, in the past, meta-directory technology has not been used to catalog meta-data of sufficiently general nature to meet the needs of a dynamically growing and changing distributed computing environment. Also, meta-directory software continues to have the disadvantages of being written to support a specific, narrow set of users working on software/hardware platforms in a manner that provides a defined, non-extensible set of functionality. What is needed is a service architecture that provides directory integration together with an ability to add links to new external data store mechanisms specified at runtime.

SUMMARY OF THE INVENTION

Briefly stated, the present invention involves a mechanism, method, and computer program product for linking a profile service instance to a plurality of external data stores. Each external data store is associated with a predefined data store connector class that describes a connector object that establishes a link and provides methods to query the associated data store. An external data store profile is created in the profile service that names the connector class. An external data store reference object is created in the profile service instance that identifies the external data store profile and a number of parameters that specify particular data desired from the external data store. A profile within the profile service instance includes an attribute that names the data store reference object. When the attribute is evaluated, the data store reference object is instantiated, optionally using parameters specified at runtime, and passed as a parameter to an instance of the data store connector class identified by the external data store profile. The external data store connector instance applies the query methods to retrieve the desired data and return the desired data to the data store reference object. The profile service instance uses the returned data as the value of the attribute.

BRIEF DESCRIPTION OF THE DRAWINGS

FIG. 4 shows an exemplary data structures for holding profile objects in accordance with the present invention;

FIG. 5 illustrates data structures within an external reference object in accordance with the present invention;

FIG. 6 illustrates an exemplary external data store profile in accordance with the present invention;

FIG. 7A through FIG. 7D show class components and relationships between classes used in an exemplary embodiment of the present invention;

FIG. 8 illustrates a flow diagram of a method for defining an external data link in accordance with the present invention; and FIG. 9 shows a flow diagram of a method for using an external data link in accordance with the present invention.

DETAILED DESCRIPTION OF THE PREFERRED EMBODIMENTS

Figure 1:
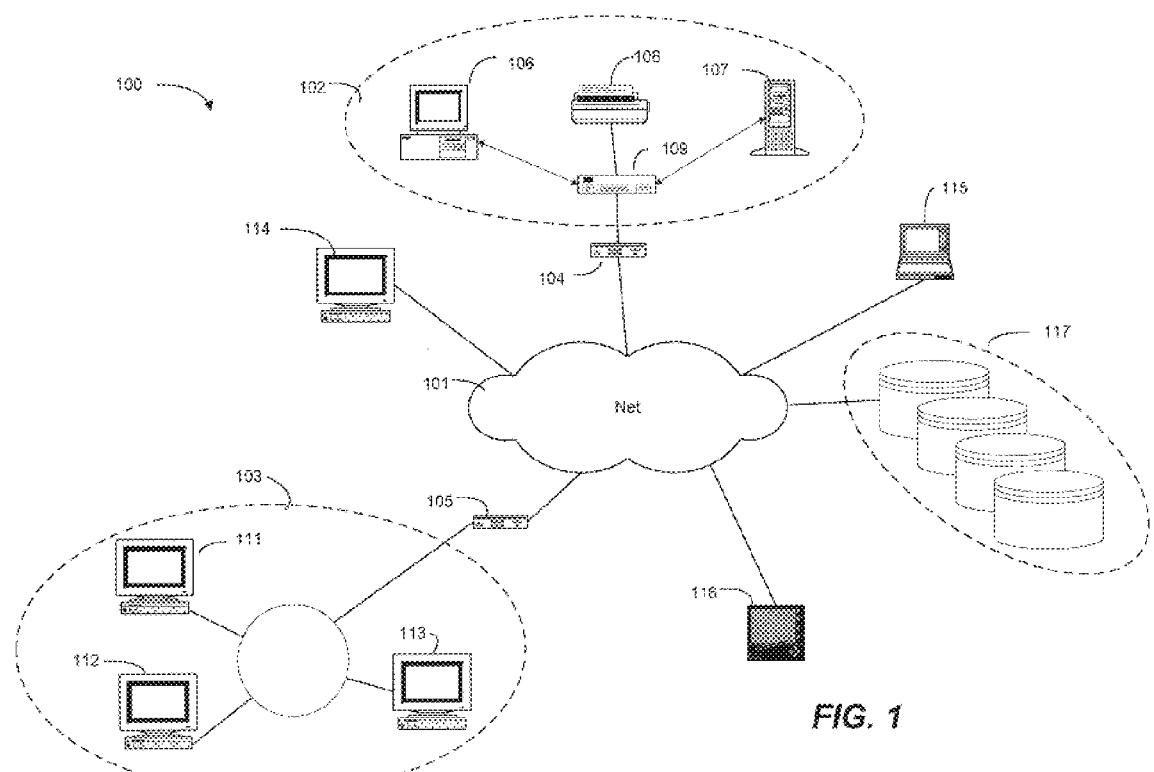
FIG. 1 illustrates an exemplary network computing environment in which the present invention is implemented.

The present invention is described in terms of a specific embodiment involving a method and system for implementing a link between a profile service an external data store. This feature turns a profile service into a functional meta-directory enabling profile information to be distributed throughout a distributed computing system. More broadly, however, the external data store link mechanism in accordance with the present invention may be applied in a wide variety of client/server applications. Accordingly, the specific examples and implementations described herein are not to be construed as limitations of the invention as claimed unless specifically noted otherwise.

A profile service is a software application executing on a server computer that provides a mechanism for storing and retrieving profile information, particularly in a distributed computing environment. Profile information refers to any information or meta-data used by a particular piece of hardware, software, or operating system to configure, initialize, shutdown and aide in making runtime processing decisions. The architecture in accordance with the present invention is described herein in terms of a layered model using industry standard components where appropriate to improve interoperability, platform independence, and to leverage existing experience.

In a specific implementation the present invention involves an architecture that employs a lightweight core profile engine (301 in FIG. 3) that provides multiple "pluggable" interfaces for runtime extensibility. The core profile engine provides essential functionality and may provide built-in (i.e., non-pluggable) interfaces as well to provide built-in functionality upon instantiation. Plug-in components are provided with the core profile engine or by third-party component manufacturers to implement functionality and program behavior that is not included in the built in "essential" functions.

The present invention primarily involves a methodology and system that can be implemented as computer program products to support integration of an arbitrary number of external data stores into a service application such as a profile service. The preferred implementations use plug-in service provider interfaces to implement data store specific access protocols for data storage mechanisms including naming and directory services for data storage mechanisms. In this manner, the core profile engine is readily extended to support new data store mechanisms, using new hardware devices and network configurations to provide meta-directory services for a heterogeneous set of data store mechanisms.

The present invention is illustrated and described in terms of a distributed computing environment such as an enterprise computing system or framework using public communication channels such as the Internet. However, an important feature of the present invention is that it is readily scaled upwardly and downwardly to meet the needs of a particular application. Accordingly, unless specified to the contrary the present invention is applicable to significantly larger, more complex network environments as well as small network environments such as conventional LAN systems.

It is contemplated that the present invention will be particularly useful in environments that need to be extensible and support a wide variety of data store mechanisms. The present invention provides a method and mechanism for defining new data stores and so can be adapted to new data store mechanisms that were unavailable or unknown when the service is first implemented. Also, the system of the preferred implementation is optimized to store and make available relatively compact units of data that serve to configure devices and computer environments rather than operational or analytical data upon which the computer environment may operate at runtime. Hence, the present invention is best used when it stores and retrieves data that is frequently searched and retrieved, but infrequently changed.

To aid understanding several words and terms used herein that have specific meanings in the context of a profile service application and so are defined below:

Attribute The combination of a key related to one or more values. Frequently described as a key=value pair.

Binding A special type of attribute where the value of the key=value pair is itself a Profile. Binding one Profile to another in a chained fashion it is possible build tree structures of related profiles and attribute information (called a profile tree).

Data store A data storage mechanism such as magnetic, optical, magneto-optical or solid state memory. A data store is a logical entity that may comprise one or more physical storage devices such as a RAID storage mechanism. The term data store also includes software applications that act as a shell or proxy for a physical data storage device such as a data access service or a database management software application.

Dedicated data store A data store mechanism that is exclusively accessible to the profile service so that no other applications can alter data within the dedicated data store.

External data store A data store mechanism that is coupled to the profile service through a data communication link. An external data store may be local (i.e., closely coupled through a data bus) or remote (i.e., coupled through a network connection) with respect to the profile service instance.

Profile A collection of attributes related either directly or indirectly to a EntityProfile that represents some sort of entity such as a user.

EntityProfile A collection of attributes that establish the root of a profile tree and serve as the base representation of some entity. This is the core data object around which the entire Profile Service is designed to function. In an object oriented sense an EntityProfile extends a Profile to add special functions & behavior.

ProfileList A special type of Profile whose member attributes (with the exception of some system attributes) are themselves Profiles. In an object oriented sense a ProfileList extends a Profile to add special functions & behavior.

Profile Service The term generally used to refer to all of the functional interfaces of Profile Service and/or an implementation of. The term is frequently used to refer specifically to the core Profile Service interface.

Profile Service Interface The core functional interface of the Profile Service. This interface provides functions for creating, searching and removing profiles in addition to some administrative utilities.

Profile Interfaces A term used to collectively refer to the functional interfaces of Profile, EntityProfiles and ProfileLists. These interfaces provide functions for manipulating the composition of individual Profiles.

Resource ID An identifier that is constructed by the Profile Service to uniquely identify every constituent profile and attribute therein. Resource IDS have a well defined string structure.

Profile Type A special attribute of all Profiles. This attribute is mandatory for all profiles and plays an important role in generating resource IDS and data indexing.

Entity-Entity ID A special attribute of all EntityProfiles. This attribute plays an important role in generating resource IDS and data indexing. The Profile Service enforces the rule that all entity IDS are unique within the set of all EntityProfiles of the same type.

List Key A special attribute of all ProfileLists. This attribute plays an important role in generating resource IDS and data indexing. The Profile Service enforces the rule that all profiles bound to a ProfileList are bound to the key such that that the profileList.attKey=memberProfile.listKey.value. ProfileLists may only have one member Profile with a specific list key value.

List Members A term used to refer to the collection of Profiles bound to a ProfileList. Each bound profile is referred to as a member.

FIG. 1 shows an exemplary computing environment 100 in which the present invention may be implemented. Essentially, a number of computing devices and groups of devices are interconnected through a network 101. For example, a LAN 102 and a LAN 103 are each coupled to network 101 through gateway machines 104 and 105 respectively. LANs 102 and 103 may be implemented using any available topology such as a hub and spoke topology of LAN 102 and a loop topology of LAN 103. LANs 102 and 103 may implement one or more server technologies including, for example a UNIX, Novell, or Windows NT, or peer-to-peer type network. Each network will include distributed storage implemented in each device and typically includes some mass storage device coupled to or managed by a server computer. Network 101 comprises, for example, a public network such as the internet or another network mechanism such as a fibre channel fabric or conventional WAN technologies.

LAN 102 includes one or more workstations such as personal computer (PC) 106. LAN 102 also includes a server machine 107 and one or more shared devices such as printer 108. A hub or router 109 provides a physical connection between the various devices in LAN 102. Router 104 is coupled through gateway 109 to provide shared access to network 101. Gateway 109 may implement any desired access and security protocols to manage access between network 101 and devices coupled to network 102. Similarly, network 103 comprises a collection of workstations 111, 112 and 113 that share a common connection to network 101 through gateway 105.

Distributed computing environment 100 further includes a wide variety of devices that have a logical connection to the network supported by a physical connection to network 101. For example, a stand alone workstation 114 may couple to network 101 through a modem or other suitable physical connection. Likewise, notebook computer 115 and palmtop computer 116 may connect to network 101 using known connection technologies. It is contemplated that a wide variety of devices may join the distributed network 100 including mobile phones, remote telemetry devices, information appliances, and the like. An important feature of the present invention is that it tolerates and adapts to an environment filled with heterogeneous hardware devices coupled to the network 101 from a variety of physical locations.

Each of the devices shown in FIG. 1 may include memory, mass storage, and a degree of data processing capability sufficient to manage their connection to network 101. The computer program devices in accordance with the present invention are implemented in the memory of the various devices shown in FIG. 1 and enabled by the data processing capability of the devices shown in FIG. 1. In addition to local memory and storage associated with each device, it is often desirable to provide one or more locations of shared storage such as disk farm 116 that provides mass storage capacity beyond what an individual device can efficiently use and manage. Selected components of the present invention may be stored in or implemented in shared mass storage such as disk farm 116.

Figure 2:
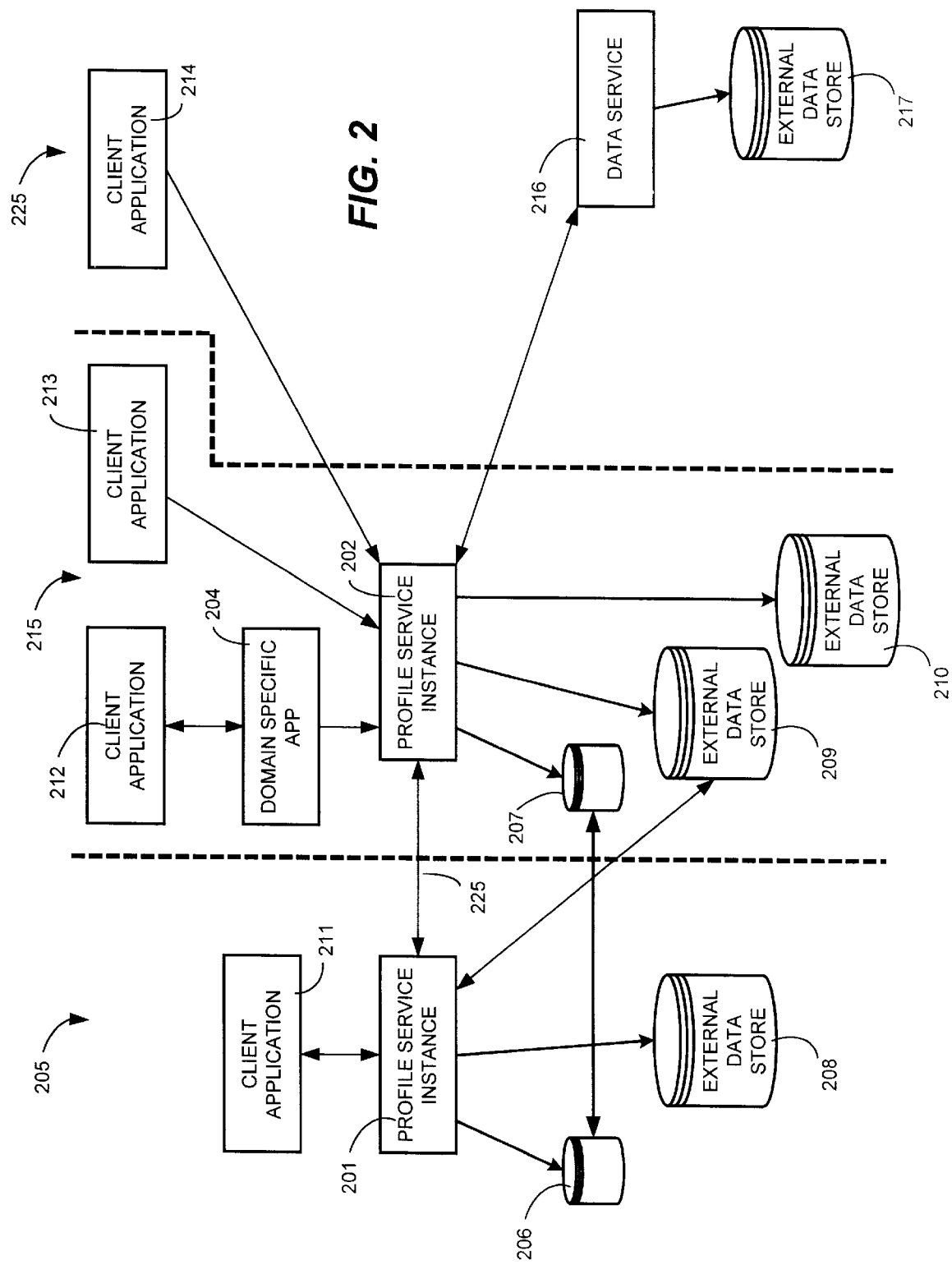
FIG. 2 shows a more specific network architecture in which in which the present invention is employed.

FIG. 2 shows a generalized diagram of the present invention implemented in a distributed computing environment including three geographic regions 205, 215 and 225. The bold dashed lines indicate geographic boundaries that separate the hardware upon which the various elements shown in FIG. 2 may be implemented. Connections between components are indicated by lines with arrowheads and are typically bi-directional unless specifically indicated otherwise by this description. The connections represent physical and logical connections that may be implemented using any available communications protocols and data transport mechanisms including both public and private network facilities.

The environment of FIG. 2 includes two profile services instances 201 and 202. Each profile service instance is implemented in a separate geographic environment (e.g., a LAN or standalone environment) as suggested by the dashed vertical lines in FIG. 2. The local environments are coupled by an available WAN connection provided by, for example, a continuous connection, an on-demand connections, and/or multiplexed connections.

A client application 211 accesses the profile service instance 201 to request profile services. The profile service instance 201, performs the requested service using a virtual profile data store comprising dedicated data store 206, local external data store 208 and remote external data store 209. Profile service instances 201 and 202 are each associated with a dedicated data store 206 and 207 respectively. The dedicated data stores 206 and 207 are local to their associated profile service instance and are not used by other applications. Dedicated data store 206 and 207 may be implemented using any available persistent storage device such as a magnetic, optical, or magneto-optical disk, solid state memory, and the like. Dedicated data store 206 and 207 may use only a portion of the physical storage device upon which they are implemented. For example, data store 206 may be a single volume or file on a multi-volume storage device. Likewise, dedicated data store 206 and 207 may each comprise multiple physical storage devices that cooperate through, for example, a RAID controller or file system software.

In an exemplary implementation, profile service instances include a build-in adapter for coupling to their associated dedicated data store. The built-in adapter may be implemented using, for example, a lightweight directory access protocol (LDAP) that provides an industry standard directory access mechanism. Other directory access protocols including industry standardized and proprietary protocols may be equivalently substituted in particular applications. A feature of the present invention is that some or all of the contents of a dedicated data store are replicated across each dedicated data store of each profile service instance in a given system. It is contemplated that not all of the data need be replicated as some profile data will be of a nature that will only be used in a given geographic area and replication may be wasteful. For example, if it is known that client application 214 never requests profile services through profile service instance 201, any profile information held in dedicated data store 207 about client application 214 need not be replicated in dedicated data store 206. The degree and manner of replication is determined to meet the needs of a particular application.

"User entities" such as client software and/or hardware use the profile service by establishing a runtime binding to a profile service instance. In FIG. 2, client applications 211, 212, 213 and 214 and application 204 represent user entities. Client application 212 is an indirect user of profile service instance 202 because it accesses through the domain-specific application 204. Domain specific application 204 is essentially an adapter or shell that provides accessibility when, for example, client application 212 is unable to communicate with an external service.

Each profile service instance 201 and 202 include one or more plug-in remote protocol adapters in addition to any built-in protocol adapters. Each remote protocol adapter implements a transport protocol supporting communication with a client 211–214) and a particular communications network used by the client. For example, remote protocol adapters may implement hypertext transfer protocol (HTTP) with embedded extensible markup language (XML) documents, HTTP with hypertext markup language (HTML) forms, remote method invocation (RMI), common object request broker (CORBA), and the like. It is contemplated that other transport mechanisms may be useful in particular applications such as transport mechanisms specified for fibre channel fabrics as well as proprietary transport protocols. The markup language document is used to encode commands and control information in a declarative fashion in a readily transportable fashion. Accordingly, any available encoding format that is readily transportable using the available transport mechanism (e.g., HTTP) is suitable. These and other implementations are considered equivalent to the specific embodiments disclosed herein unless specifically indicated otherwise.

Important functions of a protocol adapter include providing a data transport mechanism that is compatible with the associated client and with the physical communication link between the client and the profile service instance. Further, where the data transport mechanism requires, the protocol adapter must translate messages from and to the client application into a form that can be embedded in the data transport mechanism. In addition to plug-in protocol adapters, one or more protocol adapters may be built in to the profile service itself.

Each profile service instance 201 and 202 include plug-in interfaces for coupling to external data store mechanisms. As shown in FIG. 2, profile service instance 201 couples to a local external data store 208 and a remote external data store 209. In operation each profile service 201 and 202 make a runtime binding to an arbitrary number of storage provider plug-ins to make the necessary connections to store and retrieved data from external storage devices. External storage devices 208, 209, 210 and 217 may be accessed using any available storage access mechanisms including X.500, LDAP, Novell directory service (NDS), network file system (NFS), network information system (NIS), remote method invocation (RMI), common object request broker (CORBA) and the like. By providing an appropriate plug-in, new directory services that have not been defined when the core profile service is written can be integrated into the system in accordance with the present invention.

As illustrated by the instance in region 215, multiple client applications 212–214 may access a single profile service instance. Typically, a client application would attempt to access the profile service instance in the same geographic area, however, one may not be available as in the case of mobile users. Because the profile service instance can plug-in remote protocol adapters as needed to support a communication link, the client applications need not be using the same hardware or software platform, and may be using different data transport protocols to access profile service instance 202. Similarly, a single profile service instance can attach to a variety of heterogeneous data store devices simultaneously.

As shown in geographic region 225, remote data service applications such as service 216 can also be attached using storage provider plug-ins. A data service application may be implement a comparatively simple operation such as a network file system or more complex such as a meta-directory, an on-line data service such as LEXIS or DIALOG commercial on-line data services, an internet search engine, or a database front end such as SQL database management software.

As suggested by link 226, multiple profile service instances can be federated to establish a single logical profile database by setting configuration parameters on the desired instance (e.g., instances 201 and 202 in FIG. 2). Collaboration is implemented utilizing a combination of profile and field level identifiers and request forwarding between instances of the profiling service over link 226. When two profile instances are linked, the profile information stored in the dedicated databases 206 and 207 become available to each of the instances. This creates a potential for conflict if a profile service attempting to access a profile or attribute within a profile cannot distinguish between two profiles or between two or more attributes of a profile. In accordance with the present invention, each profile and each attribute is marked with a resource identifier. Previously unconnected profiling service instances can be connected with virtually no risk of data conflicts by leveraging the resource identifiers built-into the core profiling service.

Figure 3:
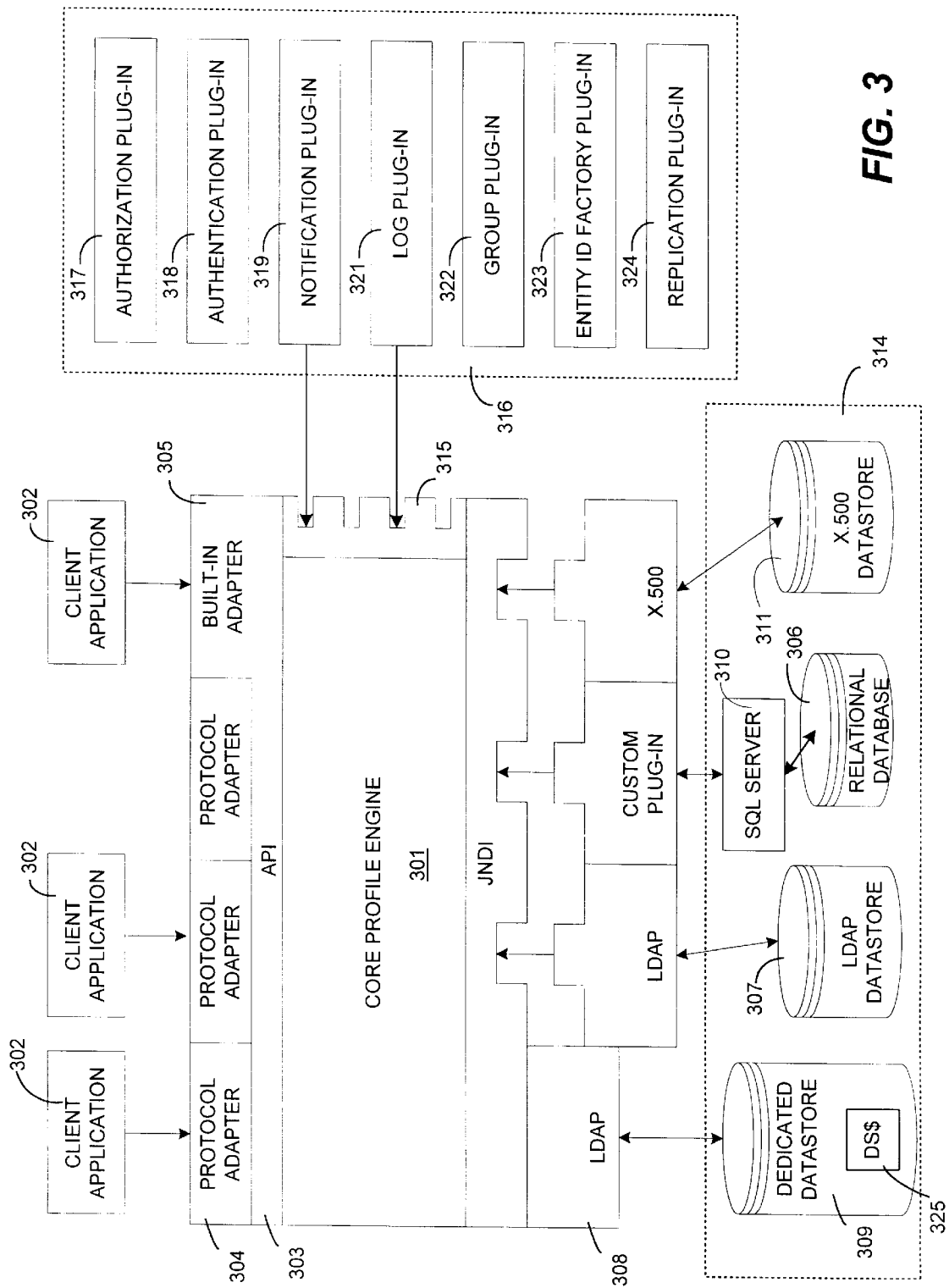
FIG. 3 shows in block diagram form significant components in a particular example of a profile service mechanism in accordance with the present invention.

FIG. 3 shows a more detailed example of an implementation of the present invention. The components include a core profile engine 301 that is accessed by a client application 302 through a profile services application programming interface (API) 303. API 303 implements within itself or attaches to one or more protocol adapters 304. Client applications 302 that have a corresponding interface to one of protocol adapters 304 send and receive messages through API 303 to core profile engine 301. The messages enable client application 302 to send data and commands to request profile services from core profile engine 301.

In a particular implementation the profile service API 303 includes a built in protocol adapter 305 to provide client accessibility without any plug-in adapters 304. In a particular embodiment, built-in adapter 305 implements a protocol based on extensible markup language documents embedded within hypertext transport protocol (HTTP) data packets. The XML documents have embedded elements that contain formatted versions of request and response messages communicated between client application(s) 302 and core profile engine 301. XML documents are a useful format because the language is well understood, actively developed, and readily transportable through a variety of communications media using commonly available HTTP transport mechanisms. Routers, switches, network ports, and other network devices recognize XML formatted documents embedded in HTTP data transport packets and are configured to handle them appropriately and reliably. It is contemplated that other formats and transport mechanisms may be used such as HTML or SGML format documents. Also, other transport mechanisms may be useful in particular applications such as transport mechanisms specified for fibre channel fabrics as well as proprietary transport protocols. The particular transport protocol is often chosen to comply with limitations of installed network hardware and software. These and other implementations are considered equivalent to the specific embodiments disclosed herein unless specifically indicated otherwise.

Core profile engine 301 responds to the client request messages by passing the message to an appropriate method to execute requested functions on virtual profile data store 314. Core profile engine 301 comprises a profile manager object and a plurality of profile objects that are described in greater detail with reference to FIG. 5A and FIG. 5B. Typically the core profile service will respond to a request message by accessing profile information from its dedicated data store or an external data store (shown in FIG. 2) and generating a response message. The response message is sent back through API 303 to the appropriate protocol adapter 304 (or built-in adapter 305) to the requesting client application 302.

In the implementation of FIG. 3, core profiling engine 301 includes a built-in interface for attaching to data storage devices. In the particular example of FIG. 3, Java™ naming and directory interface™ (JNDI) is used. JNDI is a commercially available naming and directory interface that includes a pluggable service provider interface (SPIs). JNDI is essentially an API that provides naming and directory functionality to applications written in a Java programming environment. Java and Java Naming and Directory Interface are trademarks or registered trademarks of Sun Microsystems, Inc. in the United States and other countries. JNDI is defined to be independent of any specific directory service implementation. Hence, a variety of directories including legacy, emerging, and already deployed directories can be accessed in a common manner. In operation core profile engine 301 causes JNDI to create a transparent runtime binding to naming and directory service such as an X.500 or LDAP data store as shown in FIG. 3.

It is contemplated that instead of or in addition to JNDI the present invention may also incorporate a built-in interface to support directory access to its associated dedicated data store 307. Because dedicated data store 309 is not accessed by other applications, a compiled, built-in interface may be more appropriate and efficient than a plug-in interface. In the example of FIG. 3, built-in LDAP module 308 is used to access dedicated data store 309. However, the JNDI layer provides flexibility in the choice of the mechanism used to implement dedicated data store 309 as the LDAP module 308 is readily replaced by any of a wide variety of available modules.

Virtual profile data store 314 may comprise a single data storage device, but more often comprises a plurality of disparate, heterogeneous data storage devices. The specific example of FIG. 3 includes an LDAP data store, 307, X.500 data store 311, and a relational database 306 accessed through a database application such as a structured query language (SQL) server 310. As noted above, virtual profile data store 314 may also include flat data file(s), object oriented database(s) and the like. Virtual data store 314 includes a dynamically changing number of data store devices as data store mechanisms can be added, changed, modified and deleted by modifications to the associated adapter module.

The core profiling engine 301 includes another pluggable interface 315 for attaching to one or more optional pluggable service modules such as modules 317–324, that provide supporting functionality and implement program behavior. The set of plug in service modules 316 are optional in that core profile engine 301 will run even if no plug-in modules are available. Modules are plugged in by specifying an initialization parameter when the profile manager object within core profile service 301 is instantiated. The initialization parameter comprises an address or fully qualified path pointing to a location at which the plug-in module is stored. The plug-in module need not be stored locally or in the same machine as the core profile engine 301. Upon instantiation, core profile engine 301 creates a runtime binding to the plug-in service module and thereafter the program behavior embodied in the plug-in module is available. While plug-in service modules will typically extend functionality of core profiling service 301, it is contemplated that in some applications a plug-in module may override or overload basic functionality and behavior implemented as built-in functions within core profile service 301. In this manner the core profiling engine can be customized and extended to meet the needs of a particular application.

Example plug-in service modules shown in FIG. 3 include authorization module 317 and authentication module 318 that implement authentication and authorization for a particular application. Some implementations may not need this service and so it is not integrated into core profile engine 301. Also, the complexity of these features will vary significantly in response to the needs of a particular application. These modules combine with core profiling service 301 to provide enterprise level functionality and are fully optional.

A notification plug-in implements functionality that is responsible for executing trigger-specified notifications of external systems. It is contemplated that the notification engine plug-in may itself use a pluggable architecture to handle notification in different formats based on the destination of the notification. In general, when a profile record is updated other profiles may require or desire to be updated as well. For example, consider a case involving a human resources profile having attributes for a plurality of employees within the organization. An employee may change addresses or phone numbers and other profiles, such as an employee phone directory profile, may need that information. Notification may be lazy or immediate depending on the type of notification. An employee that has been terminated may require immediate notification to security and expense account profiles, for example.

Yet another example of a plug-in module is event logging module 321 that functions to record events that occur in the profiling service. File systems often are implemented with logging functions to enable the system to recreate transactions in the event of hardware failure. Logging module 321 is similar to such a logging function, however, is not limited to file-system type logging. Instead, any profile information or operation within profile service 201 (shown in FIG. 2) may be logged.

Group plug in 322 is used to define and manage group specifications in profile service 301. A group is an organizational entity that includes members that have shared attribute information by virtue of their membership. A group may be, for example, a workgroup or team within an organization, a suite of software applications, a group of hard disk drives that form a RAID storage set, and the like. The members of each group may share specified privileges or have specified restrictions imposed on them. In the particular example group services are not built into core profile service 301 because the types of groups and form of group management is expected to take exceptionally application-specific form. Accordingly, it is more efficient to add the group behaviors as special purpose plug-in modules rather than increase the bulk of the core profiling service. It should be understood that the group plug-in, as with any other plug-in, can be built into the core profiling service if desired with some expected increase in size and complexity of the core profiling service.

Another example of a plug-in module is enityIDFactory 323. As noted hereinbelow, the present invention supports a special type of profile referred to as an entity profile that has a unique ID associated with it. The unique ID enables the profile to be readily distinguished from all other profiles of the same type. While it is a simple task to assign unique Ids and that task could readily be built into core profile service 302, it has been found that users wish to exert some control over the manner in which Ids are assigned. Accordingly, implementation of ID assignment by a plug-in module enables this task to be customized to satisfy user desires.

Replication plug-in 324 implements functionality required to replicate the contents of dedicated data store 206 and 207 shown in FIG. 2. As noted hereinbefore, users may wish to customize the replication methodology by specifying only a portion of the dedicated database that is replicated. Moreover, user's may wish to specify the frequency and timing of replication events to balance the need for replication against the cost of transporting data between replicas. Replication plug-in provides this customizable functionality.

The present invention is intended to integrate several physical data stores into a single, distributed logical data store of reference information. The profile service in accordance with the present invention provides a high-speed mechanism to lookup, structure and store key/value pairs stored in data structures called profiles. These key/value pairs represent information about "entities" such as application software, users, hardware devices, and the like.

As used herein, a "profile" is a data object containing a set of key/value pairs, such as profile 400 shown in FIG. 4. Each key/value pair is referred to as an "attribute" such as attribute 412 in FIG. 4. The value associated with a given key may be either a primitive value (e.g., a numeric value, string value, logical value, and the like) as illustrated at 401, another profile as illustrated at 413, or an external data store reference as shown at 402, When the value is another profile the value is referred to as a "subprofile or binding". An individual profile in data structure 400 comprises 0 to n attributes and 0 to n subprofile bindings 402 where "n" is an arbitrary value selected to meet the needs of a particular application. In the example of FIG. 4, profile names are enclosed by brackets [ ] and attributes 401 are represented as key=value pairs.

All profiles contain a type attribute. When the value of an attribute is a subprofile, the key is the type of the subprofile. In the case when the value is a subprofile the key/value pair is called a "binding". By binding several profiles it is possible to build hierarchical trees of information. It is possible to bind a profile to multiple parent profiles by a link or reference which is referred to herein as "linking". Linking enables the representation of relational information in addition to hierarchical information. Individual attributes may have multiple values set as illustrated by the publickey attribute in the Security profile in FIG. 4. However, each binding has only a single value, although each profile may contain any number of bindings. Moreover, a bound subprofile may itself contain other subprofile bindings enabling a hierarchical structure.

As used herein, the term "object" refers to a data structure stored in mass storage or memory accessible by a computer that contains specified data and a set of methods or operations that enable the object to perform operations on the data it contains. The methods contained in an object also implement an interface enabling the object to receive data from and send data to other computer program devices. Data structure 400 is a representation of a profile object. It should be understood that the physical implementation of data structure 400 may vary significantly from application-toapplication and may be implemented as a contiguous segment of storage locations or a dispersed arrangement of physical locations that are logically ordered in a manner shown in FIG. 4.

In general, when a profile is created it must be the "child" of some other profile, or it must be an "entity profile". In FIG. 4, profile 411 labeled "Contact" is an example of entity profile. An entity profile is a special subclass of a profile object that has an additional fixed attribute 412 called an entityID. The profile service in accordance with the present invention provides facilities (either built in or by way of plug-in 323 shown in FIG. 3) for generating the entityID in a manner such that all entity profiles of the same type have unique entityIDs. Essentially, entity profiles serve a special role of establishing roots from which other profiles may be attached. Entity profiles support all of the operations of a profile, but add in addition support for some specialized method for accessing the ID attribute.

Entity profiles are useful to represent users, contacts, resources, components, groups, and the like. All of these entities have a discreet and meaningful independent existence and role in the real world. In contrast, conventional profiles (i.e., nonentity profiles) must always be attached as a child to either an entity profile or another nonentity profile. Nonentity profiles are useful for representing data such as display preferences, demographic information, identification information, and the like. All of these groups of information are meaningless unless related to some stand alone concept such as a user, resource, component, and the like.

DemographicList and PostalworkList in FIG. 4 are examples of another special profile type called a "profilelist". A profilelist relates multiple profiles of the same type to a single parent. This is done by binding a single profile list (e.g., postalworklist) to the parent (e.g., Contact) with multiple member profiles (e.g., "gb" and "us" in FIG. 4) are added to the list. While ProfileLists are serve to collect profiles of the same type, it is contemplated that they may also be used as a convenient collection object for subprofiles of different types. It is important to note that profilelist member profiles may not contain any attributes and do not support the concept of a schema. As a result of this limitation, several profile operations are not supported by ProfileLists.

Data structure 400 also includes structures for storing meta-data attributes (not shown) for each express attribute shown as well as meta-data attributes that apply to the entire profile 400. These meta-data attributes control how profile service 201 manipulates the express attributes shown in FIG. 4. Among these meta-data attributes in an attribute that indicates whether the attribute is a list profile, a subprofile binding, or an external data reference. In other words, attribute 402 includes a meta-data attribute indicating that attribute 402 is an external data reference. Profile service 201 then knows that the value of attribute 402 is an object identified as "ExternalDataReference_A" rather than a primitive value or subprofile binding.

FIG. 5 shows a simplified data structure within a external data reference object 501 that is the value of attribute 402 in FIG. 4. As suggested by the structure of FIG. 5, external data reference object 501 may be implemented as a profile wrapped in an object defined by an external data reference class 721 shown in FIG. 7C. The attributes of object 501 may be stored for example, in dedicated data store 206 or 207. Significant attributes of object 501 include a "data store profile" attribute that includes the data store name or other identification of an external data reference profile, (discussed below in reference to FIG. 6). A data store profile also includes connect information, and a specification of default cache rules. While the particular implementation uses a profile structure to store the data reference information, this is a matter of convenience. In practice, any available data structure may be used to store this information to meet the needs of a particular application.

A "Field" attribute and a "Query" attribute specify values used to query or retrieve specific data fields from the associated data store. Using an example where the external data store is a relational database, the Field=attribute specifies a value that is akin to the value of a "select" clause in an SQL query. Similarly, the Query=attribute specifies a value or values akin to the "from" and "where" clause in an SQL statement. It should be understood that the external database does not have to be a relational database, and the value of the field=and query=attributes is tailored to meet the needs of the associated data store.

The values in the field=and query=attributes may be parameterized as suggested by the values with a "$" prefix (i.e., $Name and $SSN) in FIG. 5. A parameterized value serves as a placeholder for a value supplied at runtime by the profile service itself. ExternalDataReference object 501 includes an interface that accepts parameters corresponding to the parameterized values. A parameter value is swapped into the value of another attribute within the profile at the time of evaluation. In this manner, an external data reference object 501 functions as a generic query object that is customized at runtime to a specific context.

When parameterized values are used, object 501 is provided with a sample profile (e.g., [SampleProfile] 502 in FIG. 5) that provides an example of the parameter data required by the parameterized values. In this way the external data reference object 501 can be instantiated, tested and validated at the time of creation to verify that it will resolve to real data. Parameterized values are optional, however, and it is contemplated that in many cases external reference object 501 will explicitly specify values for the field=and query=attributes.

Preferably, object 501 includes an attribute specifying cache rules. In the preferred implementation object 501 is instantiated in response to an attempt to evaluate attribute 402 shown in FIG. 4. Object 501 will return one or more data items retrieved from the associated external data store to the calling profile and these returned data items will be used as the value for that attribute. As a general rule the profile service instance 201 will not store or cache the returned data items in dedicated data store 206 or 207. The profile service instance does store the external reference in the dedicated data store, but not the data itself. However, in some applications is may be desirable to store a cache copy of the returned data items in a cache data structure such as data store cache (DS$) 325 shown in FIG. 3. A cache copy may allow core profile engine 301 to retrieve the external data more quickly if it is used again, and may enable core profile service to return data if a link to the specified external data store is not available for some reason.

Cache rule attributes that are specified include, for example, a value indicated whether or not to cache, a value indicated that if data is cached how long will it remain valid, and a value indicating whether an expired cached value may be used if a link to the external data store cannot be made to refresh the cached value. The DS$ available to the profile service instance can thus serve as a smart cache by automatically refreshing its contents according to the specified cache rules. This feature enables mission critical applications to continue operation with the appearance of failsafe operation when in fact the underlying virtual data store 314 is less reliable. While this feature goes against conventional wisdom of data store access, it should be recalled that the present invention is enhanced to store data that is seldom changed and is not primary data that is being used for data analysis and the like. Hence, the uncertainty with respect to the freshness of cached values is a tolerable uncertainty and a strong preference may be given in some instances to making sure that the client application requesting the profile data gets useful data in return.

FIG. 6 shows an example external data store profile 601 that in the particular embodiment comprises a profile stored in dedicated data store 206 and/or data store 207. The external data store profile 601 is a conventional profile object that names an external data store connector object (PhoenixLDAP_Datastore in FIG. 6). External data store profile 601 may include a number of optional properties that are passed to and used by the referenced external data store object. The referenced external datastore connector object is a predefined object from the class 731 shown in FIG. 7D. The external datastore object contains the data store-specific connection methods used to establish a link to an external data store. It is contemplated that the external data store connector class will be defined by the provider of the external datastore mechanism as the class definition will extend the usefulness of their external datastore. Alternatively, the external datastore class may be defined by third party vendors or users.

The operation and interaction of the data structures illustrated in FIG. 4–FIG. 6 are better understood in conjunction with the class descriptions for component classes within or accessible to the core profile engine 301. FIG. 7A through FIG. 7D show simplified class diagrams indicating basic functional objects and characteristics of a profile service in accordance with the present invention. Each class description lists significant methods within the class that relate to the present invention. The profile service supports two basic functional objects, profiles themselves and a "profile manager". The profile manager interface is alternatively referred to as the profile service interface. The logical interfaces shown in FIG. 7A and FIG. 7B are not intended to be literal. Instead they are intended to articulate the fundamental functional operations that the service supports. All implementation of the profile service desirably support these classes of functions. In addition, individual implementations may support additional methods that are not supported in all implementations to meet the needs of a particular applications.

The profile service supports two basic functional objects, profiles themselves and a "profile manager". Additionally, two support classes called external data reference (FIG. 7C) and external data store connector (FIG. 7D) define methods used specifically to access external data store mechanisms. The logical interfaces shown in FIG. 7A thorough FIG. 7D are not intended to be literal. Instead they are intended to articulate fundamental functional operations that the service supports. All implementations of the profile service desirably support these classes of functions to implement external data store links. In addition, individual implementations may support additional methods that are not supported in all implementations to meet the needs of a particular applications.

FIG. 7A lists functions implemented in profile objects. All of the listed functions require the specification of a profile upon which the function will operate. The profile can be specified, for example, by passing context information from the requesting entity to the profile service in the request message. The profile class shown in FIG. 7A lists functions available in instances of profile objects. In general, this category of methods manipulate attributes within a specified profile. Hence, once a profile object is created it is autonomous in the sense that it can be directly accessed by user calls and it no longer relies on the profile manager (discussed in reference to FIG. 7B) to enable attribute manipulation.

In the exemplary implementation profile objects include meta-data associated with each attribute indicating such information as read/write/execute permissions, ownership, and the like. Meta-data is used by the profile service to for managerial purposes, but is not considered an explicit part of a profile as it is not normally provided in response to attribute access requests. Nevertheless, each profile includes meta-data manager methods for retrieval and modification of attribute values.

Schema methods within profile objects create and maintain a profile schema. A profile schema is created to enforce specified properties on all profile instances of a particular type. For example, consider a profile of type=employee. If no schema is defined, for each instance of the type= employee an independent profile is created in such a way that each profile can have a different set of attributes, subprofile bindings, and external data references. In contrast, when a schema is defined for a specified profile type, the schema specified a minimum set of attributes that must be included in the new profiles of that type and enforced upon new instances of that Subprofile binding methods are used to bind profiles to other profiles. Functions offered by the subprofile binding methods include method to list and retrieve existing bindings within a profile, as well as to create new bindings, revise existing bindings, and destroy existing bindings.

Profile objects also include search, template, and control methods as indicated in FIG. 7A. A search method accepts a user entity specified search expression, returns a list of subprofiles, or possibly attributes of a specified profile, that match the specified search expression. Template methods control the manner in which a given profile refreshes itself against a specified template to which it is attached. By attaching a profile to a template, changes in the template are reflected in the attached profile whenever the profile's refresh method is activated. Refresh can be performed on demand by the user entity, or automatically as specified in the template methods. Control methods include, for example, methods that define whether the profile can be extended by a user. As noted hereinbefore, a powerful feature of the present invention is that profiles can be dynamically extended by users. However, the present invention also provides a means by which this feature can be turned off.

Entity profile objects include variables, data and methods necessary to define basic functional interfaces of entity profiles described hereinbefore. In the specific example of FIG. 7A the entity profile class extends the profile interface (i.e., it supports all the methods found in the profile interface) by providing several method that are specific to entity profiles. The profile list class includes variables, data and methods necessary to define basic functional interfaces of profile lists described hereinbefore. The profile list class also extends the profile interface and provides additional methods used to look at and manipulate the contents of a profile list.

The profile manager class 711 shown in FIG. 7b provides a mechanism for creating, retrieving and establishing schemas for profiles. Essentially, the methods summarized in FIG. 7B include factory methods that create new profiles (including entity profiles and profile lists), retrieve profiles, search profiles, define profile schema, and implement external data store methods. Search methods are substantially similar to the search methods used in profile objects, however, search all attributes within a specified profile rather than all attributes hierarchically below a specified profile.

Of particular interest to the present invention are external data store methods included in the profile manager class used to manipulate external data store profiles and external data reference objects. The "defineExternalDatastore" method is used to define a new external data store profile such as profile 601 shown in FIG. 6. This method accepts as parameters a name which comprises, for example, a string value specifying an arbitrary or user-defined name for the new external datastore. The defineExternalDatastore method also accepts a string value indicating the name of a datastore connector class 731 (shown in FIG. 7D) that will implement the external datastore object for this specific data store.

Additionally, this method accepts other properties specific to the named datastore connector object 731. These other properties are conveniently represented as a hashtable representing a set of key=value pairs (i.e., attributes). The defineExternalDatastore method may also accept parameters specifying the cache rules, and may accept parameters indicating a client context that is used to verify the client's identity and privilege to perform this operation. In a particular implementation the defineExternalDatastore method returns the internal ID of the datastore (i.e., the vale of the name specified when the defineExternalDatastore method is called).

The "removeExternalDatastore" method removes or deletes an already defined external data store profile from the dedicated datastore 206 and/or 207. This method may also use the client context parameter to verify identity and privileges and returns a boolean "True" if the remove operation is completed successfully. The "ListExternalDataStores" method returns a listing of external datastore profiles defined within a given profile service instance. The steps followed to create an external data link using the methods shown in FIG. 7B are described in greater detail with reference to the flow diagram shown in FIG. 8.

The "newExternalDataReference" method creates a new external data reference object such as external data reference object 721 shown in FIG. 7C. The newly defined external data reference object can then be assigned to the value of any attribute in any profile. In a particular example the newExternalDataReference method accepts as a parameter a string indicating the ID of the external data store profile (e.g., profile 601) that should be used to gain access to the true data store for this value.

An instance of a new external data reference object encapsulates the information items shown in FIG. 5 as well as implementing the behavior and interface defined by the methods shown in FIG. 7C. Other string parameters specify initial values for the field, query, sample profile, and cache rules (as shown in FIG. 5) for the new external data reference object. The client context information may be used to verify the calling client's identity and privilege to perform the operation. The newExternalDataReference method returns a boolean value indicating success or failure of the method. An external data reference object 721 returns a value to an attribute that names the external data reference object. The returned value comprises one or more pieces of information extracted from an external datastore named within the external data reference object 721.

External data reference objects 721 include methods to set and get the attribute values within that object's data items (shown in FIG. 5). When an external data reference object is created (using the newExternalDataReference method) it is assigned a value for the DataStoreProfile attribute. Subsequently, a data store reference object can be queried to return the value of this attribute. The functionality of other methods within external data reference object 721 set and get the corresponding information items shown in FIG. 5.

The external data reference object defines an interface that interacts with a serialized interface of an external datastore connector object 731 shown in FIG. 7D. This serializable interface is used to communicate connection and access requests made by an external datastore connector over a network link. A data store connector object 731 will have an interface that accepts instances of the external data reference object 721 as a parameter. The data store connector object 731 returns data records to the external data reference object 721. In turn, external data reference object 721 returns a value (which may comprise multiple data items) to the profile in which the external data reference object was evaluated.

Important methods within an external datastore connector object include an init( ) method that instantiates the external datastore object. The init( ) method may be called by the external data reference object 721 or by other mechanisms within the profile service to test or verify a connection to an external data store. The connect( ) method establishes a logical connection to the external data store mechanism and may use any protocol supported by the external data store mechanism including hypertext transport protocol (HTTP), fibre channel protocols, common object request broker (CORBA), remote method invocation (RMI) and the like. The reconnect( ) method operates in a similar fashion to reestablish a previously established connection. In a particular implementation the connect( ) method is called automatically when a connector object is instantiated.

The read( ) and write( ) methods take a query string provided by, for example, an external data reference object 721 and perform a read or write (update) operations on the specific data record(s) specified by the query string. A read( ) method returns an arbitrary number of records generated by the external data store. A write( ) method returns a boolean value indicating success of the update operation. External data store connector object 731 also includes a validateReference( ) method that accepts a candidate query and returns a boolean value indicating whether the candidate queyr will resolve to real data. An query can be tested by instantiating an external data reference object 721 with sample data from the specified sample profile and passing the external data reference object 721 to the external data store connector object 731 with a call to the validateReference( ) method. The optional close( ) method is used to expressly close a connection to an external data store although it is contemplated that a service may operate without a need to expressly close a connection.

FIG. 8 shows steps in a process of creating the data structures that will implement a link between a service application and an external datastore. In step 801 the process in accordance with the present invention is started by creating a datastore connector class that defines data store-specific connection methods and parameters. Step 801 may be performed by a data store manufacturer or provider, a user with detailed knowledge of the external data store connection protocol(s), or a third party software vendor. Each external data store mechanism such as devices 208, 209, 210, 216 and 217 shown in FIG. 2, will require its own datastore connector class definition and corresponding datastore object(s).

A client application creates an external data store profile in step 802 using, for example, the defineExternalDataStore( ) method shown in FIG. 7B. Step 802 is performed by passing the required parameters to the defineExternalDataStore( ) method resulting in an external datastore profile being created in dedicated datastore 206 and/or 207. In step 803 an external data reference object is created by calling to, for example, the newExternalDataReference( ) method shown in FIG. 7B. In the particular example step 803 results in a profile like that shown in FIG. 5 being stored in the dedicated datastore.

The newly created external data reference object can be tested in step 804 by instantiating the object and passing it as a reference, using a sample profile if necessary, to the associated connector object. The connector object will return a value indicating whether the external data reference object resolves to valid data. Step 804 may be repeated as needed whenever an external data reference object is modified. Once validated, one or more profiles may assign an attribute value equal to the external data reference object in step 805 using, for example, attribute manager methods shown in FIG. 7A.

FIG. 9 shows steps in a process of using the data structures created by the steps shown in FIG. 8 that will establish and use a link between a service application and an external datastore. When an attribute having a value that is an external data reference object is being evaluated, named external data reference object is instantiated in step 901. Step 901 uses parameter data passed to the external data reference object at runtime to fill any parameterized values specified in the field or query data items. The external data reference object reads the external datastore profile in step 902 to determine, among other things, the identity of the datastore connector object it must use to actually link to the external data store.

The external data reference object instantiates the specified connector object in step 903 by calling an init( ) . Preferably step 903 results in a connection being established by, for example, a connect( ) method within the connector object. The external data reference object is passed as a parameter to the connector object in step 904. The connector uses the received parameter to issue a query on the external data reference mechanism in step 905. This query may be a read or write query depending on the needs of the particular application. In step 906 the data returned by the external data store is returned to the external data reference object and supplied as the data attribute's value in step 907.

It will be appreciated that the profile service architecture described herein provides generic profiling capability accessible over conventional network facilities and readily integrated with a wide variety of software application in a manner that defines the fundamental behavior, representation, and functional interfaces for profile objects. Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A mechanism for linking an external data store to a profile service instance, the mechanism comprising:

a profile service instance having a number of predefined built-in functions and a number of profile object instances;

an external data store interface within the profile service;

a data store connector object instance having methods therein for managing a connection to a specified data store; and a data store query object having a name, the data store query object including parameter data therein for selecting data from the data store specified by the data store connector object.

2. The mechanism of claim 1 wherein the data store query object is instantiated in response to evaluating the profile object instances that references the data store query object's name.

3. The mechanism of claim 1 wherein each profile instance comprises a plurality of attributes where a value of at least one attribute refers to the data store query object.

4. The mechanism of claim 1 further comprising an external data store definition having a name that is referenced by the data store query object and an attribute indicating the data store connector object instance, wherein the data store connector definition is stored as one of the plurality of profile objects.

5. The mechanism of claim 1 wherein the methods contained within the data store connector object include a method to create a runtime link between the profile service and the specified data store.

6. The mechanism of claim 1 wherein the methods contained within the data store connector include a method to read data from the specified data store using the parameter data contained in the database query object.

7. The mechanism of claim 1 wherein the methods contained within the data store connector include a method to write data to the specified data store using the parameter data contained in the database query object.

8. The mechanism of claim 1 further comprising a dedicated data store coupled to the profile service instance, the dedicated data store comprising structures for storing the profile object instances;

a cache structure within the dedicated data store; and cache method definitions stored within the data store query object specifying a manner in which data returned from the specified external data store is cached in the cache structure.

9. The mechanism of claim 8 wherein the data store query object further comprises methods for accessing selected data from the cache rather than from the data store connector object.

10. The mechanism of claim 4 wherein the parameter data in the data store query object specifies a data store name matching the data store name of the external data store definition, a field list indicating fields from the external data store to be included, and a query string indicating portions of the external data store that will participate.

11. The mechanism of claim 10 wherein the parameter data includes parameterized values that serve as placeholders for parameters supplied by the profile service instance upon instantiation of the data store query object.

12. The mechanism of claim 11 further comprising:

a sample profile within the data store query object, wherein the sample profile includes attributes specifying sample values corresponding to the parameterized values; and a validation method in the connector object that tests validity of the external data store profile using the sample values in the sample profile.

13. A mechanism for creating an external data link to a profile service instance, the mechanism comprising:
   a profile service instance having a number of predefined built-in functions and a number of profile object instances;
   a dedicated data store coupled to and exclusively accessed by the profile service instance;
   a data store-specific external data store connector object definition accessible by the profile service instance and defining a plurality of methods for connecting to an external data store;
   an external data store reference class accessible by the profile service instance and defining and external data reference object having a plurality of methods for manipulating attributes within instances of the data reference class;
   a method within the profile service instance operable to create an external data store profile in the dedicated data store, where the external data store profile has a name and specifies the connector object definition, and a number of data store-specific properties;
   a method within the profile service instance operable instantiate an external data reference object based upon the external data reference class, where the external data reference object specifies a data store name matching the data store name of the external data store profile, and a field list indicating fields from the external data store to be included;
   a method within at least one profile instance operable to set a value of an attribute within that profile instance to the name of the external data store profile.

14. The mechanism of claim 13 wherein the external data reference object further comprises a query string indicating selection criteria.

15. The mechanism of claim 13 wherein evaluation of a profile attribute having a value equal to the name of an external data store causes the profile service to instantiate an external data store connector based upon the external data store profile, the external data store instance having a plurality of methods for accessing the external data store named by the external data store profile using the connector specified by the external data store profile.

16. The mechanism of claim 15 further comprising an attribute within the external data reference profile that specifies whether external data returned by the external data store object is cached in the dedicated data store.

17. The mechanism of claim 13 where the query string includes parameterized values that serve as placeholders for values supplied by an external data store instance.

18. The mechanism of claim 17 wherein the external data reference profile includes a sample profile, wherein the sample profile includes attributes specifying sample values corresponding to the parameterized values; and
   a validation method in the external data store instance that tests validity of the external data store profile using the sample values in the sample profile.

19. The mechanism of claim 18 wherein the validation method is called when a change is made to the external data reference profile.

20. A method for linking a to an external database comprising the steps of:
   providing a data store connector class defining an interface and methods for connecting to and accessing data from a specified external data store;
   defining an external data store profile having a name and comprising a plurality of attributes, wherein at least one attribute specifies the data store connector class and at least one attribute specifies a parameter used by instances of the data store connector class;
   creating an external data reference object having a name, a plurality of parameter strings, and a reference to the external data store profile; and
   creating a profile comprising a plurality of attributes where the value of at least one attribute is set to the name of the external data reference object.

21. The method of claim 20 wherein the step of providing a connector class further comprises:
   defining a data store connect module having an interface and methods for managing a connection to a specific external data store; and
   defining a data store query module having an interface and including methods to access the external data store specified by the connect module.

22. The method of claim 20 wherein instances of the data store connector class have an interface that accepts instances of the external data reference object as a parameter.

23. The method of claim 20 further comprising the step of:
   including a sample profile in the external data reference object;
   instantiating the external data reference object with parameters from the sample profile;
   validating the external data reference object by passing the external data reference object as instantiated with the sample profile parameters to an instance of the data store connector class.

24. A distributed profile service system for providing profile services to a number of user software applications, the profile service system comprising:
   a plurality of geographically distributed profile service instances, each profile service instance being coupled to a dedicated data store;
   an external data store interface within each profile service instance;
   a plurality of external data store mechanisms;
   an external data store connector object coupled to at least one profile service instance, the data store connector object having methods therein for managing a connection to a specified data store;
   an external data store connect profile stored in the dedicated data store of the at least one profile service instance, the connect profile naming the external data store connector module;
   a data store reference object having a name, the data store reference object including parameter data therein for selecting data from the data store specified by the data store connect profile; and
   a profile within the at least one profile service instance that includes an attribute naming the data reference object.

25. A computer program product embodied in a tangible form comprising:
   computer program devices readable by a data processor coupled to receive the propagating signal for managing a profile data service, the computer program product comprising:
      first program code devices providing a data store connector class defining an interface and methods for connecting to and accessing data from a specified external data store;:

second computer program code devices configured to cause a computer to define an external data store profile having a name and comprising a plurality of attributes, wherein at least one attribute specifies the data store connector class and at least one attribute specifies a parameter used by instances of the data store connector class;

third computer code devices configured to cause a computer to create an external data reference object having a name, a plurality of parameter strings, and a reference to the external data store profile; and third computer code devices configured to cause a computer to create a profile comprising a plurality of attributes where the value of at least one attribute is set to the name of the external data reference object.

26. The computer program product of claim 25 wherein the tangible form comprises a magnetic disk.

27. The computer program product of claim 25 wherein the tangible form comprises an optical disk.

28. The computer program product of claim 25 wherein the tangible form comprises a propagating signal.

29. The computer program product of claim 25 wherein the tangible form comprises a random access memory device.

30. A mechanism for linking a to an external database comprising the steps of:

means for providing a data store connector class defining an interface and methods for connecting to and accessing data from a specified external data store;

means for defining an external data store profile having a name and comprising a plurality of attributes, wherein at least one attribute specifies the data store connector class and at least one attribute specifies a parameter used by instances of the data store connector class;

means for creating an external data reference object having a name, a plurality of parameter strings, and a reference to the external data store profile; and means for creating a profile comprising a plurality of attributes where the value of at least one attribute is set to the name of the external data reference object.

* * * * *